United States Patent [19]

Hennen

[11] 3,731,473
[45] May 8, 1973

[54] HARVESTING MACHINE
[75] Inventor: John Joseph Hennen, Ottumwa, Iowa
[73] Assignee: Deere & Company, Moline, Ill.
[22] Filed: Nov. 4, 1971
[21] Appl. No.: 195,630

[52] U.S. Cl. ................................56/14.4, 56/DIG. 9
[51] Int. Cl. ..............................................A01d 45/02
[58] Field of Search ................56/14.3, 14.4, DIG. 9; 198/20 T, 123; 130/24, 26, 27 R, 27 T

[56] References Cited

UNITED STATES PATENTS 2,660,849   12/1953   Knowles ................................56/33
3,599,404   8/1971   Fernandez et al. ...................56/14.3
2,579,364   12/1951   Collins ...............................198/123

Primary Examiner—Antonio F. Guida
Attorney—H. Vincent Harsha et al.

[57] ABSTRACT

A self-propelled forage harvester having a forwardly mounted cutterhead unit for reducing crop material, a blower unit spaced rearwardly from the cutterhead unit for blowing the reduced crop material into an adjacent receptacle, and a longitudinally extending conveyor unit for conveying the reduced crop material from the cutterhead unit to the blower unit. The conveyor unit extends beneath various operating components on the harvester and is quickly removable to gain service access to these components.

4 Claims, 4 Drawing Figures

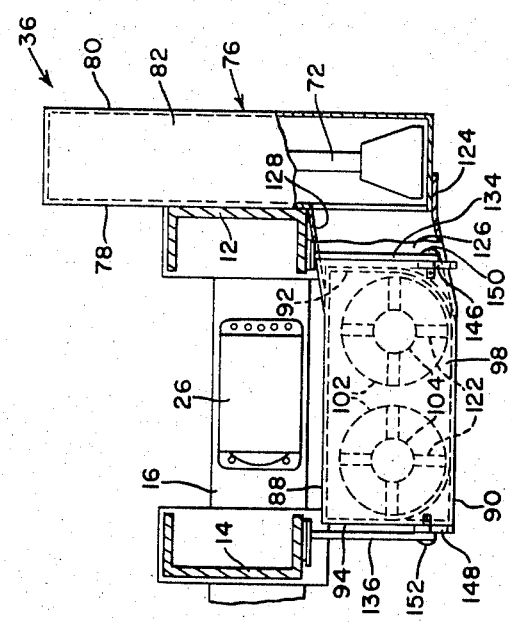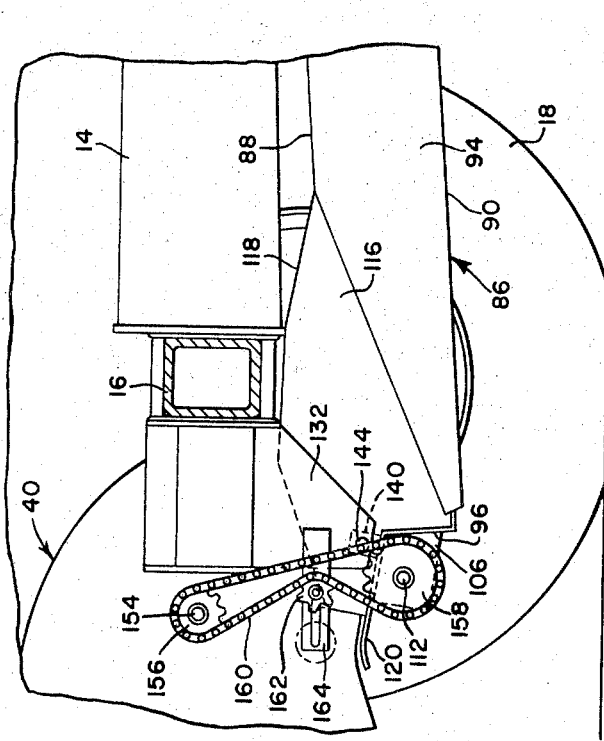

HARVESTING MACHINE

BACKGROUND OF THE INVENTION

The present invention relates generally to crop harvesting machines, and more particularly to a conveyor unit mounting arrangement for a self-propelled forage harvester.

The crop harvesting operations performed by a conventional forage harvester consist of removing the crop from the field, reducing it into relatively fine particles, and blowing the reduced crop into a trailing wagon or other receptacle. In one known type of forage harvester the reducing and blowing functions are performed by a single unit comprising a rotary cutterhead equipped with cup-shaped knives, while in another known type these two functions are performed by separate cutterhead and blower units. In the latter type of harvester the blower can be mounted either adjacent to the cutterhead unit so that the reduced crop material is discharged directly into the blower housing, or a separate conveyor unit can be employed to convey the reduced crop from the cutterhead to a blower unit spaced therefrom. The latter arrangement is illustrated in U. S. Pat. No. 3,377,785, issued Apr. 16, 1968 to Kessler, and as explained therein, is utilized to particular advantage in a pull-type machine to reduce side draft loads on the machine and to obtain improved discharge into the trailing wagon, since mounting the blower on the side of the machine opposite that on which the cutterhead is located permits the blower to discharge directly rearwardly into a wagon pulled substantially on the line of draft of the harvester.

The same basic type of arrangement, wherein a separate blower is spaced from the cutterhead and a conveyor unit is used to convey the crop therebetween, may be used to advantage on a forage harvester of the self-propelled, as opposed to the pull-type, although for somewhat different reasons. A self-propelled forage harvester necessarily has a substantially greater length than a pull-type harvester. Consequently, if either a throw-type cutterhead or a separate blower mounted adjacent to the cutterhead is used on such a machine, certain undesirable design compromises must be made to obtain a blower discharge point acceptably close to the trailing wagon. Due to the presence of propulsion mechanism and the various other operating components required on a self-propelled machine, however, such a machine is not conducive to the separate cutterhead-conveyor-blower arrangement.

SUMMARY OF THE INVENTION

Accordingly, it is the primary object of the present invention to provide a self-propelled forage harvester having a separate blower unit mounted sufficiently rearwardly thereon so that the crop material discharge point is located in close proximity to the trailing wagon, the reduced crop material being conveyed from a forwardly mounted cutterhead to the blower unit by means of a longitudinally extending conveyor unit. It is a further object of the invention to provide such a harvester in which the conveyor unit does not block service access to the various operating components contained thereon. It is a more specific object to provide such a harvester in which the conveyor unit normally extends beneath the operating components but is quickly removable from the harvester to gain access to the components. It is yet a further object to provide such a harvester in which the cutterhead unit is mounted in the lower forward portion thereof and has an optimum crop discharge angle to the conveyor unit.

The invention comprises, generally, a longitudinally extending mobile frame having drive mechanism and other operating components in its lower forward portion, a cutterhead unit mounted forwardly of the components, a blower unit mounted rearwardly of the components, and a conveyor unit communicating at its forward end with the cutterhead housing discharge opening, extending longitudinally beneath the operating components, and communicating at its rearward end with the inlet opening of the blower housing. Although the conveyor unit thus normally blocks access to the drive mechanism and operating components from beneath the machine, the unit is quickly removable from the machine to permit such access. The conveyor unit is mounted on the harvester frame with front and rear, separately releasable connections, the unit being swingable downwardly about one of the connections when the other is released. The invention further comprises quick releasable drive means between a power source on the harvester and a conveying mechanism drive shaft on the conveyor unit.

BRIEF DESCRIPTION OF THE DRAWINGS

The preferred embodiment of the present invention will be described in conjunction with the accompanying drawings in which:

FIG. 3 is an enlarged, fragmentary view taken from the side of the harvester opposite that of FIG. 2; and FIG. 4 is a sectional view taken generally along the line 4—4 of FIG. 1.

DESCRIPTION OF THE PREFERRED EMBODIMENT

In the ensuing description right- and left-hand reference is determined by facing the direction of travel of the machine.

Figure 1:
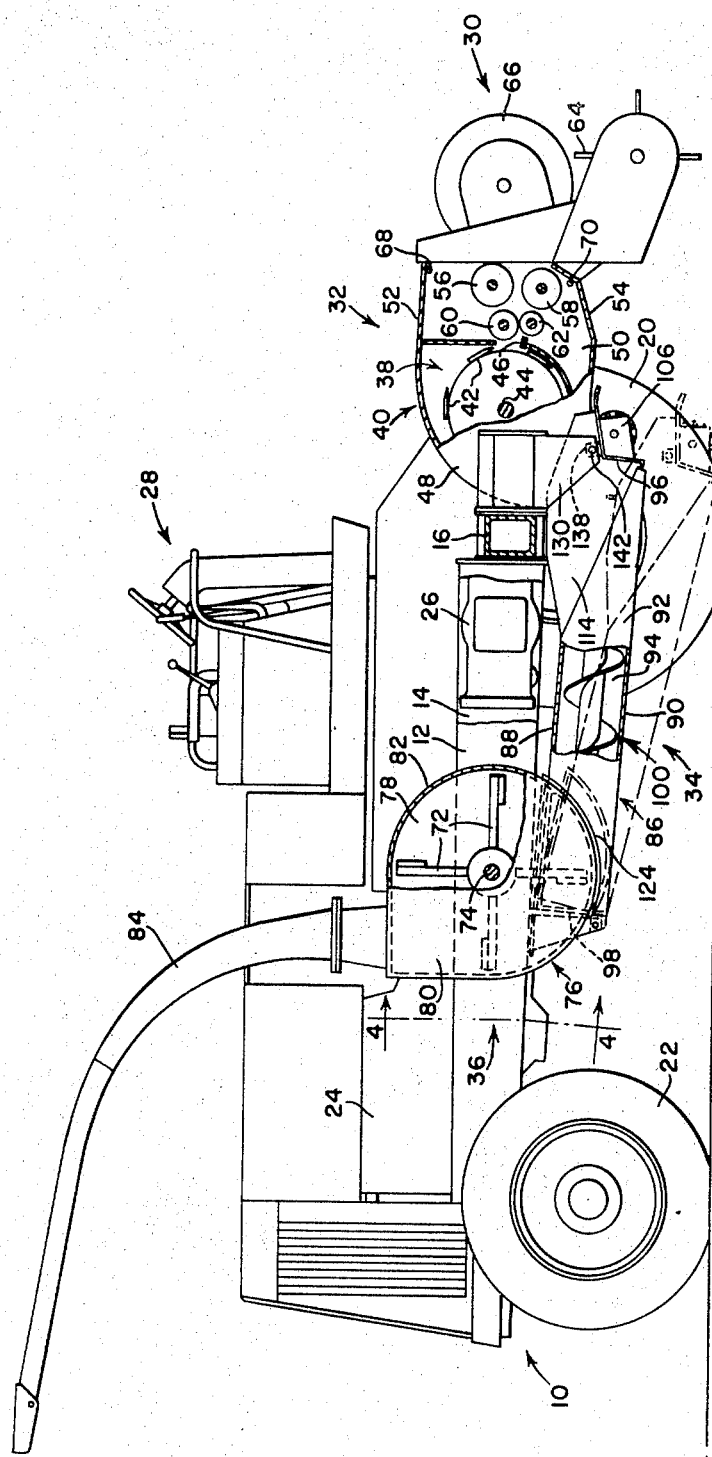
FIG. 1 is a side elevation view of a self-propelled forage harvester constructed in accordance with the principles of the invention, with portions broken away for the sake of clarity.

Referring first to FIG. 1 of the drawings, the harvesting machine illustrated includes a frame 10 comprising a pair of right and left, longitudinally extending side frame members 12 and 14 interconnected near their forward ends by a transverse axle structure 16. A pair of right and left main drive wheels 18 and 20, respectively, are rotatably supported on opposite ends of the axle 16, and a pair of rear steerable wheels 22 are supported on an axle structure (not shown) at the rear of the frame 10. The front wheels 18 and 20 are driven by means of an internal combustion engine 24 mounted just forwardly of the rear wheels 22 between the side frame members 12 and 14. Although not pertinent in its entirety and thus not fully disclosed, the drive train through which power is transmitted from the engine 24 to the front wheels 18 and 20 includes a change-speed transmission 26 mounted on the center of the axle structure 16 and extending rearwardly therefrom between the frame members 12 and 14. In addition to supplying the locomotive force for the machine, the engine 24 also drives the harvesting components included thereon, through a drive arrangement fully disclosed in U.S. Pat. No. 3,701,239, which issued Oct. 31, 1972. An operator's platform 28, from which the various functions of the machine are controlled, is situated above and transversely above the drive wheels 18 and 20.

The harvesting mechanism comprises, generally, a pickup or header unit 30 for lifting the crop from the field and delivering it rearwardly in a concentrated mass, a cutterhead unit 32 for receiving the crop from the header unit 30, reducing it into relatively fine particles and discharging it rearwardly, a longitudinally extending conveyor unit 34 for receiving the reduced crop material from the cutterhead and conveying it rearwardly beneath the machine, and a blower unit 36 for receiving the crop from the conveyor unit and blowing it rearwardly into a suitable receptacle.

The cutterhead unit 32 consists of a conventional rotary cutterhead 38 enclosed by a housing 40, the cutterhead comprising a plurality of knives 42 supported on a transverse shaft 44 for rotation therewith and cooperable with a stationary shear bar 46 to reduce crop material fed thereto. The ends of the shaft 44 extend through and are rotatably supported in spaced vertical side walls 48 and 50 which, in conjunction with upper and lower walls 52 and 54, respectively, form the housing 40. Also supported between the side walls 48 and 50, forwardly of the cutterhead 38, is an upper and lower front pair of feed rolls 56 and 58, and an upper and lower rear pair of feed rolls 60 and 62, the feed rolls cooperating in operation to engage and compress the crop material received from the header unit 30 and deliver it rearwardly to the cutterhead and shear bar. As shown in the drawings, the housing 40 opens forwardly to admit crop material from the header unit 30 and opens rearwardly and downwardly to discharge reduced crop material to the conveyor unit 34.

The pickup or header unit 30 is of the type commonly used to harvest windrowed hay and comprises, generally, a retractable finger pickup assembly 64 and a transverse feed auger 66 for feeding the crop centrally to an opening (not shown) communicating with the interior of the housing 40. The unit 30 is releasably mounted on upper and lower transverse pins 68 and 70 on the sides of the housing 40. It will be evident to those familar with the art that other types of header units, such as those adapted to harvest standing row crops, may be substituted for the unit illustrated.

The blower unit 36 is of conventional design and comprises a plurality of radially extending fan blades 72 supported for rotation on a transverse shaft 74 within a generally cylindrical housing 76. The housing 76, mounted on the outer side of the right frame member 12 substantially midway between the front and rear wheels, is formed by inner and outer vertical walls 78 and 80 interconnected by a generally circular transverse wall 82. As shown in FIGS. 1 and 4, the inner wall 78 of the housing 76 has a crop inlet opening in its lower portion through which crop material is received from the conveyor unit 34. Once inside the housing, the crop is engaged by the fan blades 72 and propelled tangentially upwardly through an opening in the transverse wall 82 and into a curved discharge spout 84. The spout 84, in turn, directs the material into a suitable receptacle, such as a trailing forage wagon.

Figure 2:
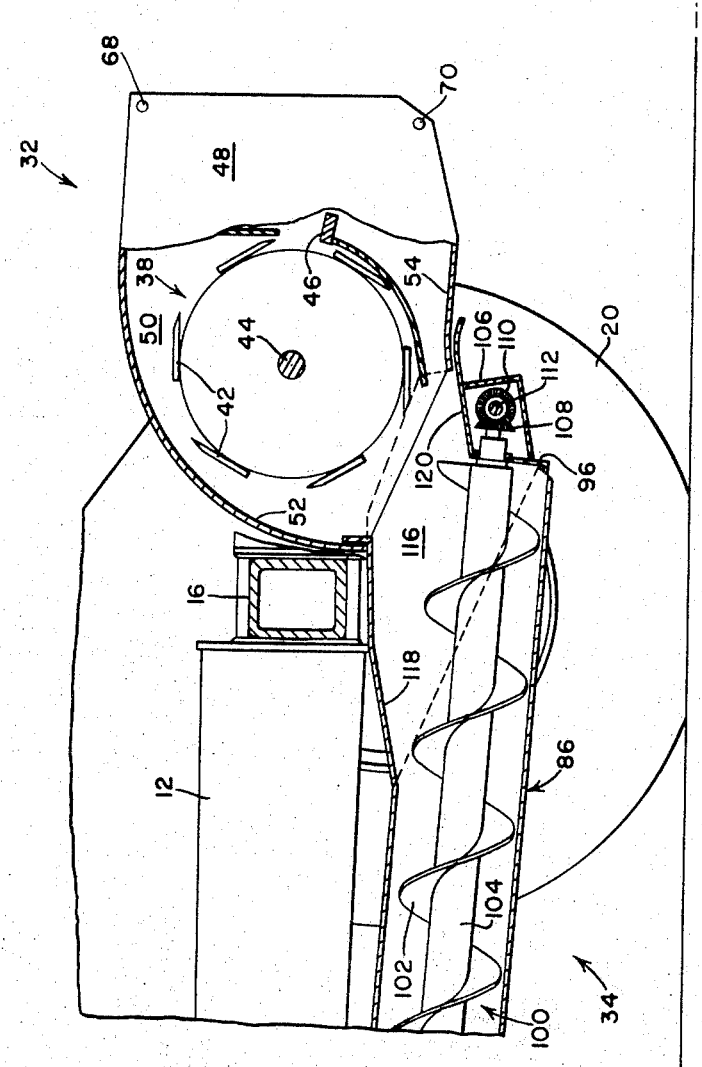
FIG. 2 is an enlarged, fragmentary side elevation view of the harvester shown in FIG. 1.

The conveyor unit 34 comprises an elongated, box-like housing 86 formed by top and bottom walls 88 and 90, respectively, right and left vertical side walls 92 and 94, respectively, and front and rear end walls 96 and 98, respectively. A pair of longitudinally extending parallel augers 100, each formed of spiral flighting 102 fixed to a shaft 104, are enclosed by the housing 86 and are rotatably supported at their front and rear ends in the housing end walls 96 and 98. As shown in FIG. 2, the forward ends of the auger shafts 104 extend into an enclosure 106 on the front side of the wall 96 and are provided with a bevel gear 108 thereon in driving engagement with a bevel gear 110 on a transverse drive shaft 112, the shaft 112 and gears 108 and 110 being contained within the enclosure 106. A drive train to be subsequently described connects a power source on the harvester with the shaft 112, to thereby rotate the augers 100 and render them operative to convey crop material from the cutterhead unit 32 rearwardly through the housing 86 to the blower unit 36.

The auger housing 86 is provided at its forward end with a flared inlet opening adapted to fit in communicating relationship with the outlet opening in the cutterhead housing 40. Right and left panels 114 and 116 extend upwardly and forwardly from the respective auger housing side walls 92 and 94 and overlap the edges of the cutterhead housing side walls 48 and 50 around the outlet opening. The flared opening is completed by upper and lower panels 118 and 120 which extend upwardly and forwardly from the auger housing top and front walls, 90 and 96, respectively, and overlap the edges of the cutterhead housing top and bottom walls 52 and 54 around the opening. In operation, the cutterhead 38 discharges reduced crop material along a trajectory passing through the flared inlet opening formed by the walls 114, 116, 118, and 120, and into the interior of the housing 86, where it is then engaged by the augers 100 and conveyed rearwardly.

When it reaches the rear of the conveyor housing, the crop is discharged laterally through an outlet opening in communicating relationship with the inlet opening in the side wall 78 of the blower housing 76, by a plurality of radially extending paddles 122 on the rear portions of the auger shafts 104. The outlet opening in the auger housing 86, as shown in FIGS. 1 and 4, is formed by an arcuate wall segment 124 which extends laterally from the bottom and side walls of the housing 86 and overlaps a portion of the transverse blower housing wall 82, and by end and top walls 126 and 128, respectively, which extend laterally from the rear and top walls of the auger housing and abut the edges of the blower housing wall 78 around the inlet opening therein.

The conveyor unit housing 86 is suspended beneath the harvester, with its inlet and outlet openings in communicating relationship with the outlet and inlet openings, respectively, in the cutterhead and blower unit housings, from a right and left pair of front bracket members 130 and 132 extending downwardly from the forward ends of the side frame members 12 and 14, and a right and left pair of rear bracket members 134 and 136 likewise extending downwardly from the frame members 12 and 14. A right and left pair of mounting tabs 138 and 140 are fixed to the respective sides of the panel member 120 on the front end of the housing 86 and extend alongside the front pair of mounting brackets 130 and 132. Transverse connecting pins 142 and 144 are removably received by aligned apertures in the brackets 130 and 132 and their associated mounting tabs 138 and 140 to connect the forward end of the housing 86 to the machine. In a similar manner, a right and left pair of mounting tabs 146 and 148 are fixed to the lower rear corners of the housing side walls 92 and 94 and extend alongside the lower ends of the rear brackets 134 and 136, respectively. Transversely aligned pins 150 and 152 releasably connect the tabs 146 and 148 to the brackets 134 and 136 to mount the rear end of the housing 86 on the machine.

As will be apparent from the drawings, the conveyor unit housing, when mounted in its operating position on the machine, effectively blocks access to the transmission 26, axle 16, and numerous other operating components in the same general area, from beneath the machine. To provide access to these components, however, the housing 86 can be removed from the machine by simply removing the transverse connecting pins. The manual removal of the relatively heavy unit is facilitated by constructing the inlet and outlet areas and the rear connecting means in such a manner that the unit can be swung downwardly about the rear transverse connecting pins 150 and 152 when the front connecting pins 142 and 144 are removed. With the front of the unit resting on the ground as shown in phantom in FIG. 1, the rear connecting pins can then be removed and the rear of the unit lowered to the ground. It will be apparent that this removal procedure requires that only about half the total weight of the conveyor unit be supported at one time.

Referring now to FIG. 3, the transverse drive shaft 112 on the forward end of the conveyor unit 34 is driven from a powered shaft 154 on the harvester which may, for example, comprise a continuation of the cutterhead shaft 44. The drive comprises a first sprocket 156 on the shaft 154 and a second sprocket 158 on the shaft 112 drivingly interconnected by a continuous length of roller chain 160. An idler sprocket 162 is adjustable fore and aft within an elongated aperture in a support 164 fixed to the left front mounting bracket 132 to take up the slack in the chain 160 during operation of the conveyor unit. When moved to its forward position shown in phantom in FIG. 3, the idler 162 permits the chain 160 to be removed from the sprockets 156 and 158 which, in turn, permits the conveyor unit 34 to be removed from the machine. The drive is quickly reconnected by merely reinserting the chain 160 on the sprockets 156 and 158 and moving the idler sprocket 162 to its rearward position shown in solid lines in FIG. 3.

To remove the conveyor unit 34 from the machine, the drive to the augers 100 is first disconnected by moving the sprocket 62 to its forward position on the support 164 and removing the chain 160 from the sprockets 156 and 158. Next, the right and left front connecting pins 142 and 144 are removed from the mounting tabs 138 and 140 and the front end of the unit is lowered to the ground as shown in phantom in FIG. 1, the unit pivoting about the rear connecting pins 150 and 152 as it is lowered. Finally, finally, the rear connecting pins are removed and the rear end of the unit is lowered to the ground. The foregoing steps are merely reversed to replace the unit 34 on the machine.

I claim:

1. A self-propelled forage harvester comprising: a longitudinally extending mobile frame supported at its forward end by a pair of transversely spaced wheels; a cutterhead unit mounted directly to the forward end of the frame and including a transverse, cylindrical cutterhead rotatably mounted within a housing having a rear crop outlet opening, said cutterhead including a shaft having an end portion which extends transversely through one side of the housing; a blower unit mounted on the frame rearwardly of the cutterhead unit and including a blower rotatably mounted within a housing having a crop inlet opening; a conveyor unit comprising at least one auger contained within a housing having a front crop inlet opening and a rear crop outlet opening; means releasably mounting said conveyor housing directly to the frame to extend longitudinally between the wheels, with the front inlet opening therein in communicating relation with the outlet opening in the cutterhead housing and the rear crop outlet opening therein in communicating relation with the crop inlet opening in the blower unit housing, said releasable mounting means including removable transverse pin means connecting the rear end of the conveyor housing directly to the frame for vertical pivotal movement of the housing between an upper position wherein the crop openings in said housing are in communicating relation with the respective crop openings in the cutterhead and blower housings, and a lower position wherein the forward end of the conveyor housing rests on the ground, said releasable mounting means further including quick releasable fastener means for connecting the forward end of the conveyor housing directly to the frame in its upper position; and drive means for transmitting power from the cutterhead shaft to the auger comprising a sprocket on the end portion of the cutterhead shaft which extends through the cutterhead housing, a transverse shaft mounted on the forward end of the conveyor housing, bevel gear means for transmitting power between the conveyor housing shaft and the forward end of the auger, a sprocket on one end of the conveyor housing shaft aligned vertically with the sprocket on the cutterhead shaft, a chain for drivingly connecting said sprockets, and idler means engageable with the chain and adjustable to permit removal of the chain from the sprockets and thereby permit the conveyor housing to pivot downwardly about the transverse pin means when the quick releasable fastener means is released.

2. The invention defined in claim 1 wherein the conveyor unit comprises a pair of transversely spaced augers, and including bevel gear means for transmitting power between the conveyor housing shaft and the forward ends of both of said augers.

3. The invention defined in claim 1 wherein the blower unit is mounted on one side of the frame, the communicating crop openings in the conveyor and blower housings are disposed on adjacent sides of these housings, and wherein the rear end of said auger includes paddle means for discharging crop transversely through said openings.

4. The invention defined in claim 1 including drive mechanism on the frame above said conveyor housing for transmitting power to the wheels, said conveyor housing being removable from the frame to permit access to the drive mechanism from beneath the machine.

* * * * *